(12) United States Patent
Kneidel et al.

(10) Patent No.: US 7,980,369 B2
(45) Date of Patent: Jul. 19, 2011

(54) LASH PREVENTION SPRING PLATE

(75) Inventors: Craig Kneidel, Wooster, OH (US); Jens Schroeter, Karlsbad (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 761 days.

(21) Appl. No.: 12/001,180

(22) Filed: Dec. 10, 2007

(65) Prior Publication Data
US 2008/0153604 A1 Jun. 26, 2008

Related U.S. Application Data

(60) Provisional application No. 60/876,317, filed on Dec. 21, 2006.

(51) Int. Cl.
*F16H 45/02* (2006.01)
*F16D 3/12* (2006.01)

(52) U.S. Cl. ............... 192/3.28; 192/55.3; 192/55.6; 192/207; 192/212

(58) Field of Classification Search ............ 192/55.3, 192/55.6, 207; 464/81, 77, 98, 160, 161; 267/161, 165
See application file for complete search history.

(56) References Cited

U.S. PATENT DOCUMENTS

| | | | | |
|---|---|---|---|---|
| 3,486,597 | A * | 12/1969 | Carlton | 192/46 |
| 3,788,099 | A * | 1/1974 | Miller | 464/98 |
| 4,588,062 | A * | 5/1986 | Caray et al. | 192/214.1 |
| 4,785,924 | A | 11/1988 | Jaeckel | |
| 6,213,882 | B1 * | 4/2001 | Okada et al. | 464/77 |
| 6,585,091 | B2 * | 7/2003 | Reinhart et al. | 192/3.28 |
| 2007/0048082 | A1 | 3/2007 | Hoffmann et al. | |

* cited by examiner

*Primary Examiner* — Rodney H Bonck
(74) *Attorney, Agent, or Firm* — Simpson & Simpson, PLLC

(57) ABSTRACT

The present invention comprises a lash prevention spring of unique design having a plurality of spring legs shaped into an s-curve and an inner circumference formed into at least one spline. The invention also comprises a lash prevention assembly in which the disclosed lash spring is attached to a damper hub and is biased against the several teeth from a turbine hub that extend through the damper hub from its opposite side.

10 Claims, 7 Drawing Sheets

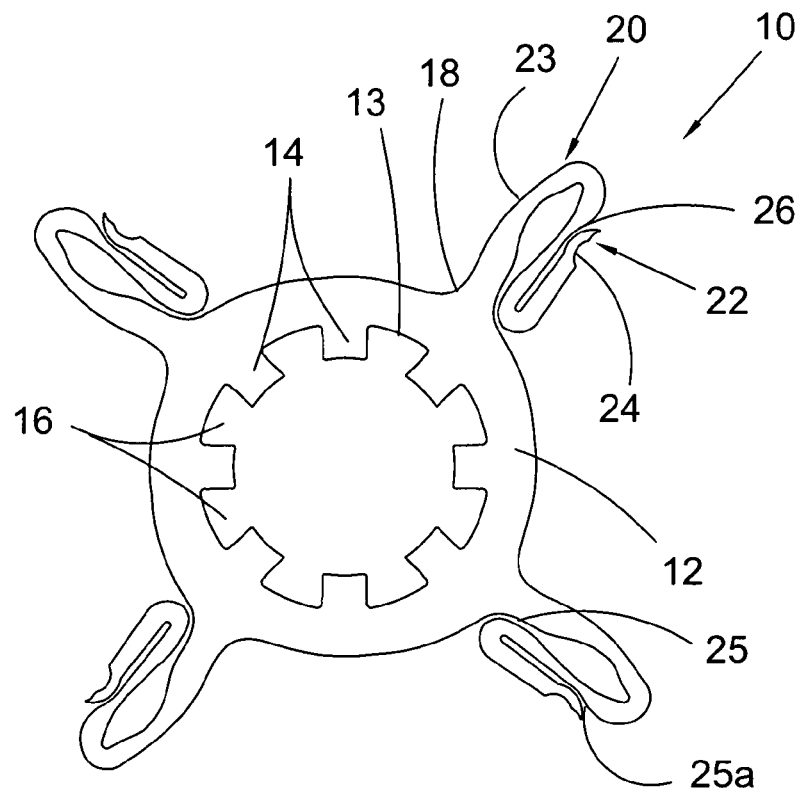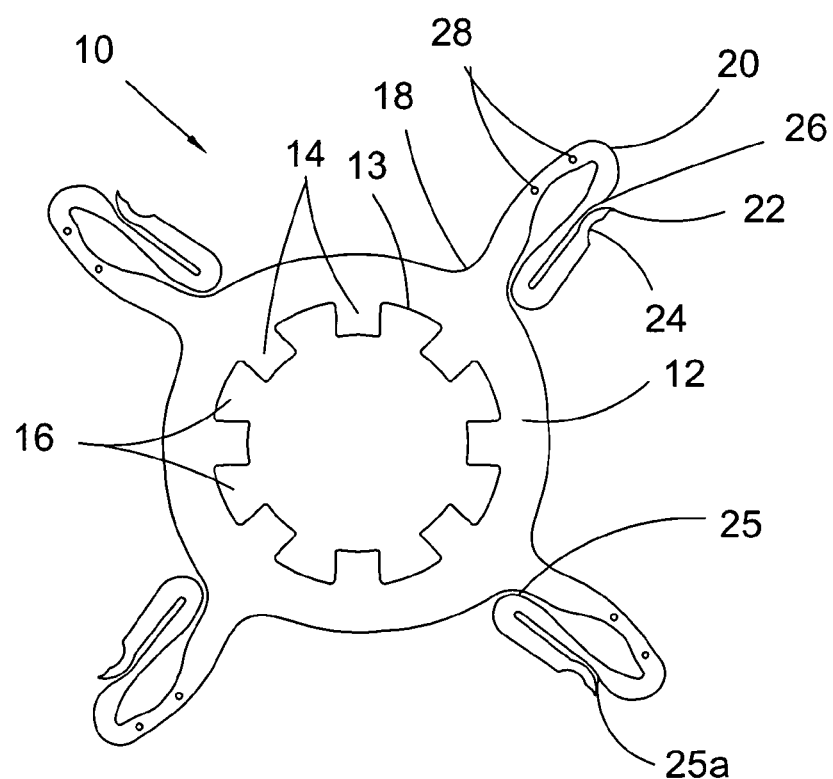

LASH PREVENTION SPRING PLATE

CROSS-REFERENCE TO RELATED APPLICATIONS

This application claims the benefit under 35 U.S.C. §119 (e) of U.S. Provisional Application No. 60/876,317 filed on Dec. 21, 2006 which application is incorporated herein by reference.

FIELD OF THE INVENTION

The present invention generally relates to the reduction of vibrations in devices subject to rotational motion and more particularly to improvements for reducing lash and vibration noise between spline connections of shafts, hubs and similar devices.

BACKGROUND OF THE INVENTION

Dampers used with torque converters have been known to cause an undesirable rattle in vehicles when there is excessive lash in the connection between the damper and the torque converter turbine shell. Lash is the vibration of splines within the small spaces between the splines of a rotating shaft and the splines of a second device meshed with that shaft or hub, such as a toothed gear. The gaps that cause lash are necessary to allow the two structures to be connected during assembly. However, the small spaces enable the splines of the two connected structures to collide with each other causing lash when there is a change in inertia or relative motion between the two structures such as when there is a change in torque converter turbine speed.

What is needed then is a device which can be added to a spline connection to absorb and thus reduce or eliminate lash. Reducing or eliminating lash will eliminate the possibility of rattle noise in the torque converter.

SUMMARY OF THE INVENTION

The present invention broadly comprises a lash prevention spring including a central body and a plurality of spring legs extending from the body, in which each of the spring legs forms an s-curve. The s-curve includes a portion of the middle section having a reduced width, a proximal end attached to or integral with the central body, and a distal end. The lash prevention spring also includes an internal circumference enclosed by the central body, with the internal circumference formed to include at least one spline. In a preferred embodiment, the s-curve is formed to include contact points along the length of the curve and a tension contact at or near the distal end.

The present invention also broadly comprises an assembly for reducing torsional lash in a torque converter that includes a lash prevention spring, the lash prevention spring comprising a central body, a plurality of spring legs extending from the central body, wherein each of the spring legs forms an s-curve, the s-curve including a middle section having a reduced width portion, a proximal end attached to the central body, a distal end, and an internal circumference enclosed by the central body with the internal circumference formed into a plurality of spring teeth extending radially from the internal circumference. The assembly also includes a damper hub having a damper plate with a first side, a second side, and an internal circumference having a plurality of damper teeth extending radially from the internal circumference, in which the plurality of damper teeth include both short and long teeth that alternate in position and are evenly spaced around the internal circumference, and at least one spring window defined by the damper plate and formed to hold a compression spring and at least one compression spring, each of the at least one compression springs positioned within one of the spring windows. The damper hub also includes a plurality of spring leg receiver posts fixedly attached to the damper plate, each of the spring leg receiver posts formed to contact the distal end of one of the plurality of spring legs, so that some or all of the plurality of spring leg receiver posts are positioned to contact each distal end of each of the plurality of spring legs. Finally, the assembly includes a turbine hub that includes an outer flange defining a plurality of holes, an inner circumference with a plurality of turbine teeth extending substantially perpendicularly from the inner circumference and evenly disposed around the inner circumference so that each of the turbine teeth extend between some or all of the damper teeth and each of the spring teeth contact one of the plurality of turbine teeth.

One object of the invention is to supply a spring that will reduce torsional lash within a spline connection.

A second object of the invention is to introduce a lash spring easily added to existing damper hub devices.

A third object of the invention is to provide a lash spring that will not substantially increase the combined axial length of the components forming the spline connection.

An additional object of the invention is to reduce or eliminate rattle noise generated by a spline connection.

These and other objects, features, and advantages of the present invention will be readily appreciable from the following description of the various embodiments of the invention and from the accompanying drawings and claims.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 1 is a top view of one embodiment of the lash spring of the present invention;

FIG. 2 is a top view of an alternate embodiment of the lash spring of the present invention in which at least one of the spring legs is modified to include at least one hole;

DETAILED DESCRIPTION OF VARIOUS EMBODIMENTS OF THE INVENTION

Figure 3:
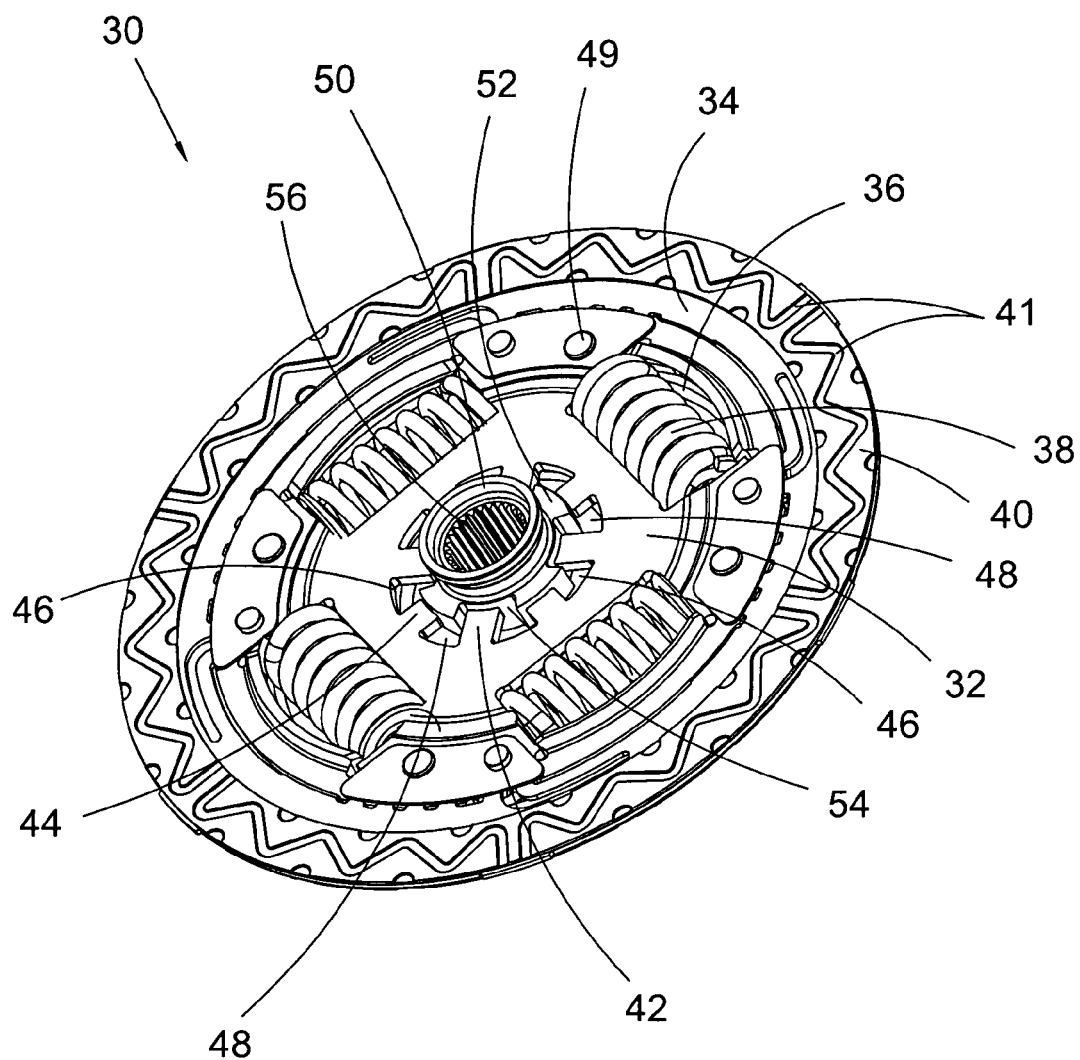
FIG. 3 is a top perspective view of one embodiment of the damper hub of the present invention.

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Adverting to the drawings, FIG. 1 is a top view of lash spring 10. Central body 12 includes an internal circumference 13 which includes at least one toothed shape spring spline 14. In the preferred embodiment shown, the entire length of internal circumference 13 is shaped into a plurality of splines 14 with a gap 16 interspersed between each spline 14.

A plurality of spring legs 20 extend from central body 12. Each of spring legs 20 is formed into an s-curve. In the embodiment shown, each of four spring legs 20 is positioned so that it extends in an opposite direction from another spring leg 20. In a more preferred embodiment, spring legs 20 are evenly spaced around central body 12. Each spring leg 20 includes a proximal end 18 adjacent to central body 12 and a distal end 22. In a preferred embodiment, tension contact 24 is formed in spring leg 20 near or at distal end 22. In an alternate preferred embodiment, spring legs 20 are integral with central body 12 such that lash spring 10 is fabricated as one integral unit.

Preferably, spring legs 20 will have a high deflection and a high spring force combined with low stress. To achieve high deflection, spring leg 20 includes a narrow flexible portion 26 on the middle section of the s-curve which has a reduced width compared to the remaining length of spring leg 20. To further increase the deflection in the design, spring leg 20 is designed to be at a maximum radius from the center axis of damper hub 30. To obtain the high force and low stress condition in the embodiment shown in FIG. 1, spring leg 20 is shaped to activate in multiple stages. Toward that end, spring leg 20 is designed to contact itself in contact areas 25 and 25a at a designed deflection. The contact occurs in multiple stages. By loading spring leg 20 under tension, it can transmit a high force without additional deflection. By preventing additional deflection, the stress in spring leg 20 is minimized.

FIG. 2 is a top view of an alternate embodiment of lash spring 10 in which at least one spring leg 20 is modified to define at least one hole 28. The holes are placed to further reduce the deflection of spring leg 20 thereby reducing the stress in lash spring 10, particularly in spring leg 20.

Preferably, lash spring 10 is manufactured from sheet metal which enables it to be used in different damper designs. The thin, flat sheet metal material allows lash spring 10 to be attached to a damper unit without significantly increasing the overall axial length of damper unit 30 and the entire assembly. This provides a space saving advantage inside a torque converter housing.

FIG. 3 is a top perspective view of damper hub 30. Damper plate 32 ("plate 32") includes an outer perimeter 34 and an inner circumference 46. Plate 32 is depicted as annular in the various figures, but it should be recognized that other shapes including irregular shapes may be used if appropriate. In one embodiment, friction material 40 is associated with plate 32. By "associated" is meant that friction material 40 may be fixedly attached to plate 32, rotatably attached to a torque converter cover plate (not shown) and pressed into plate 32 by a clutch mechanism (not shown), or otherwise interact with plate 32. Friction material 40 may include a plurality of grooves 41 which act to remove heated fluid from the friction material back into a torque converter housing.

Preferably, plate 32 also includes at least one spring window 36 formed to hold a compression spring 38. In the preferred embodiment shown, plate 32 includes a plurality of spring windows 36 evenly dispersed within plate 32. Each spring window 36 holds a compression spring 38.

Plate 32 also includes an inner circumference 46 which is formed into a plurality of splines. Each of a plurality of long damper splines 42 ("long splines 42") alternate with each of a plurality of short damper splines 44 ("short splines 44") that are evenly separated by gap or space 48 around the whole edge of inner circumference 46 with space 48 formed by splines 42 and 44 and inner circumference 46.

Also seen in FIG. 3 is torque converter output hub 50 (output hub 50") which includes a plurality of hub splines 52 evenly dispersed around the outer circumference of output hub 50. Short splines 44 are aligned with hub splines 52 meaning they extend toward but do not contact hub spines 52. Each of long splines 42 extend into hub gap 54. This arrangement creates a spline connection between damper unit 30 and output hub 50. Spring receiver posts 49 ("posts 49") are seen fixedly attached to damper 30.

Figure 4:
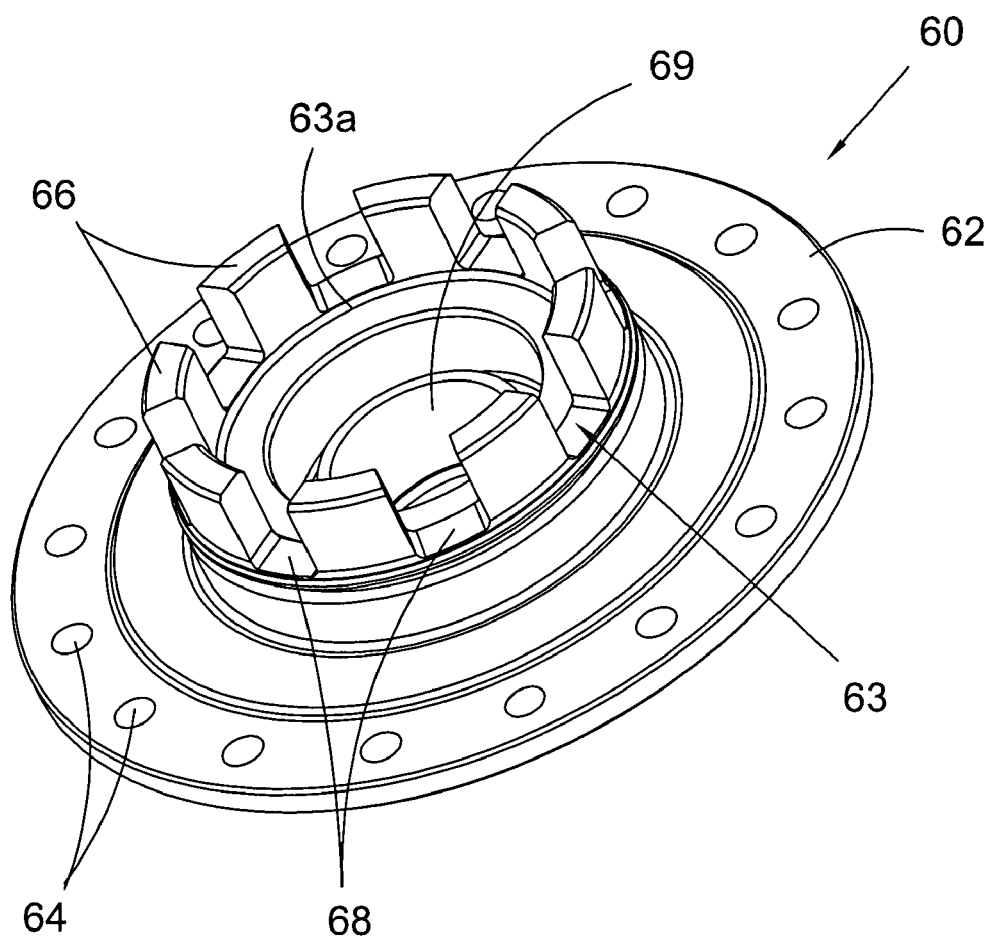
FIG. 4 is a top perspective view of one embodiment of the turbine hub of the present invention.

FIG. 4 is a top perspective view of turbine hub 60. Flange 62 forms the outer edge of turbine hub 60. In one embodiment, the plurality of holes 64 defined by annular flange 62 are used to fasten turbine 60 to the torque converter turbine (not shown). In alternate embodiments, turbine hub 60 may be attached to other torque converter components using connections well known to those skilled in the art. A plurality of turbine teeth 66 extends substantially perpendicularly from inner circumference 63. In the preferred embodiment shown, turbine teeth 66 are evenly dispersed between spaces 68, although it may be desirable to disperse turbine teeth 66 in an uneven or irregular pattern in particular embodiments. In the embodiment shown, turbine teeth 66 are separated from inner circumference 63 by offset 63a. However, in some designs, it may be more advantageous for turbine teeth 66 to extend directly from the edge of inner circumference 63.

Figure 5:
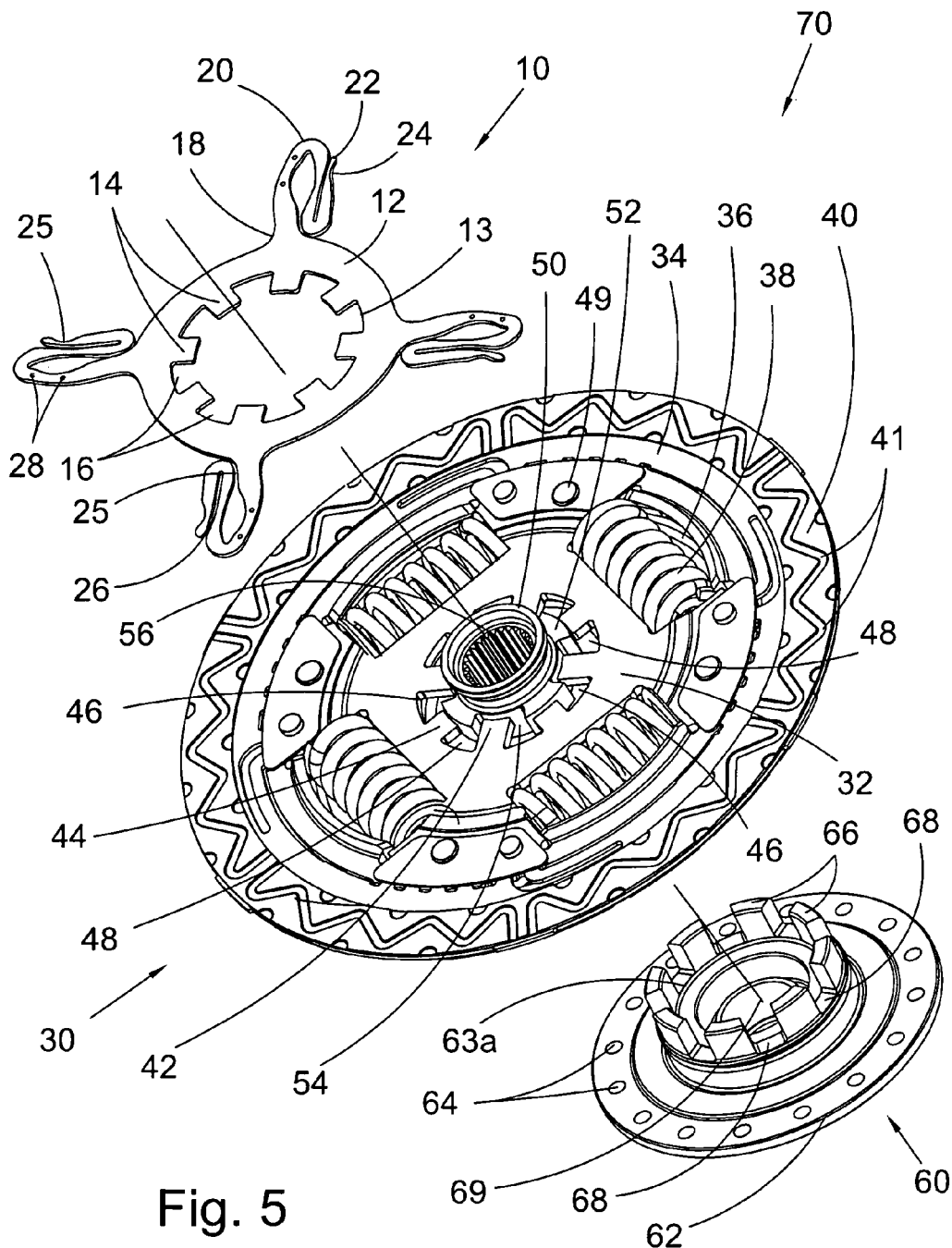
FIG. 5 is an exploded top perspective view of the three primary components of one embodiment of the lash reduction assembly of the present invention.

FIG. 5 is an exploded top perspective view of the three primary components of lash reduction assembly 70—lash spring 10, damper hub 30, and turbine hub 60. As explained below, lash spring 10 is biased against posts 49 located on one side of damper hub 30 using the spring tension created by the plurality of spring legs 20 to hold lash spring 10 in place. In a preferred embodiment, tension contacts 24 on or near distal end 22 of spring legs 20 contact posts 49. In a more preferred embodiment, tension contact 24 may be configured as a curved, a v-shaped groove, or similar shape that will partially wrap around or enclose post 49. Post 49 may be a rivet, pin, or similar structure able to withstand the shear created by lash spring 10. As explained below, lash spring 10 is attached to damper hub 30 by contacting each of spring legs 20 to some or all of posts 49 in such a way as to hold lash spring 10 in place using the tension built into spring legs 20.

Figure 6:
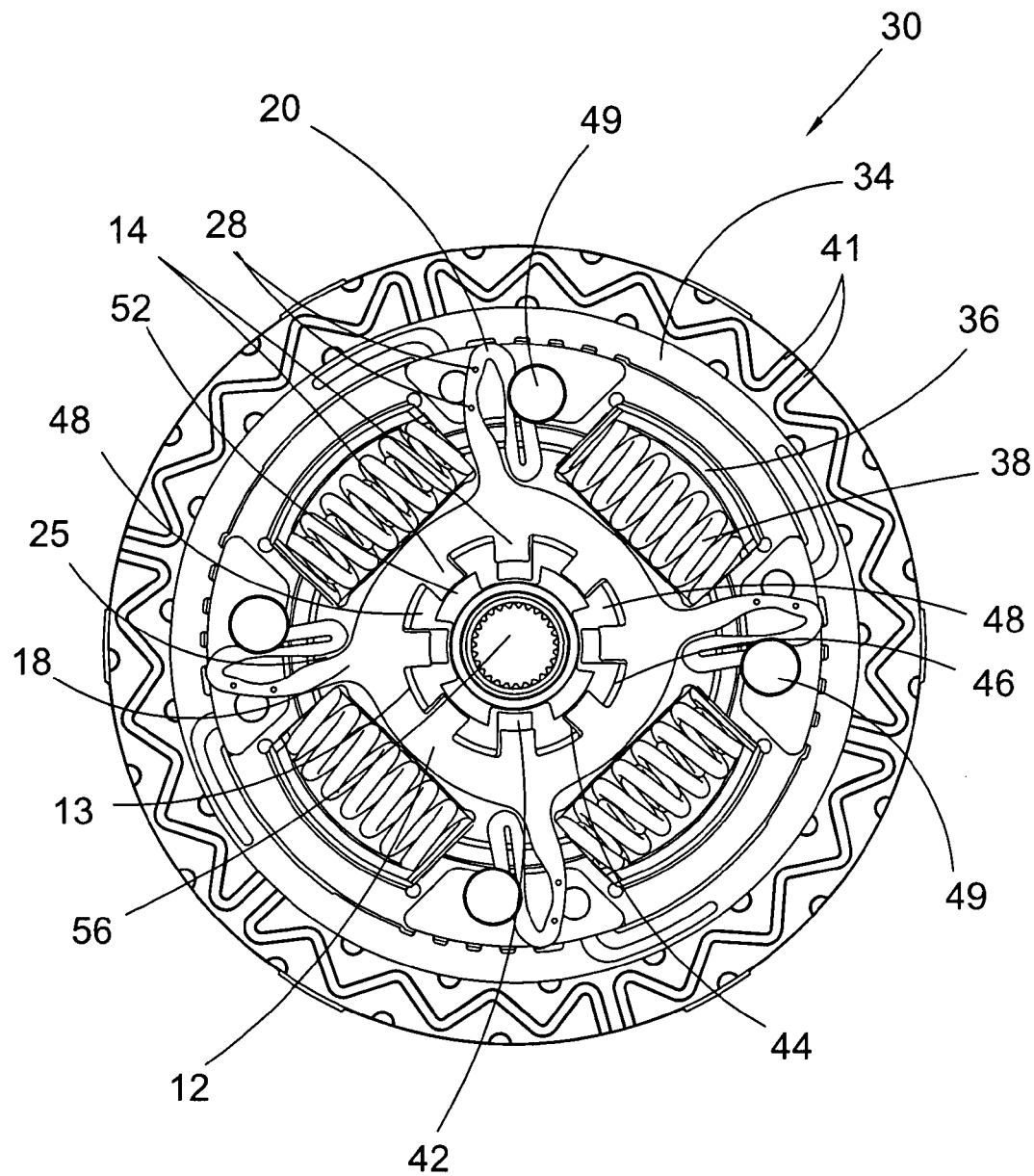
FIG. 6 is a top view depicting a preferred embodiment of the attachment of the lash spring to the damper hub in the present invention.

FIG. 6 is a top view depicting a preferred embodiment of the attachment of lash spring 10 to damper hub 30. Each of tensions contact 24 (not seen in FIG. 6) securely contact post 49 on damper 30 to hold lash spring 10 in place. Spring splines 14 are shown as slightly misaligned in relation to damper splines 42 and 44 in that each spring spline 14 is offset slightly counterclockwise from the damper spline 42 or 44 positioned beneath it. Thus, the offset orientation of lash spring 10 may be considered its natural or resting position.

Figure 7:
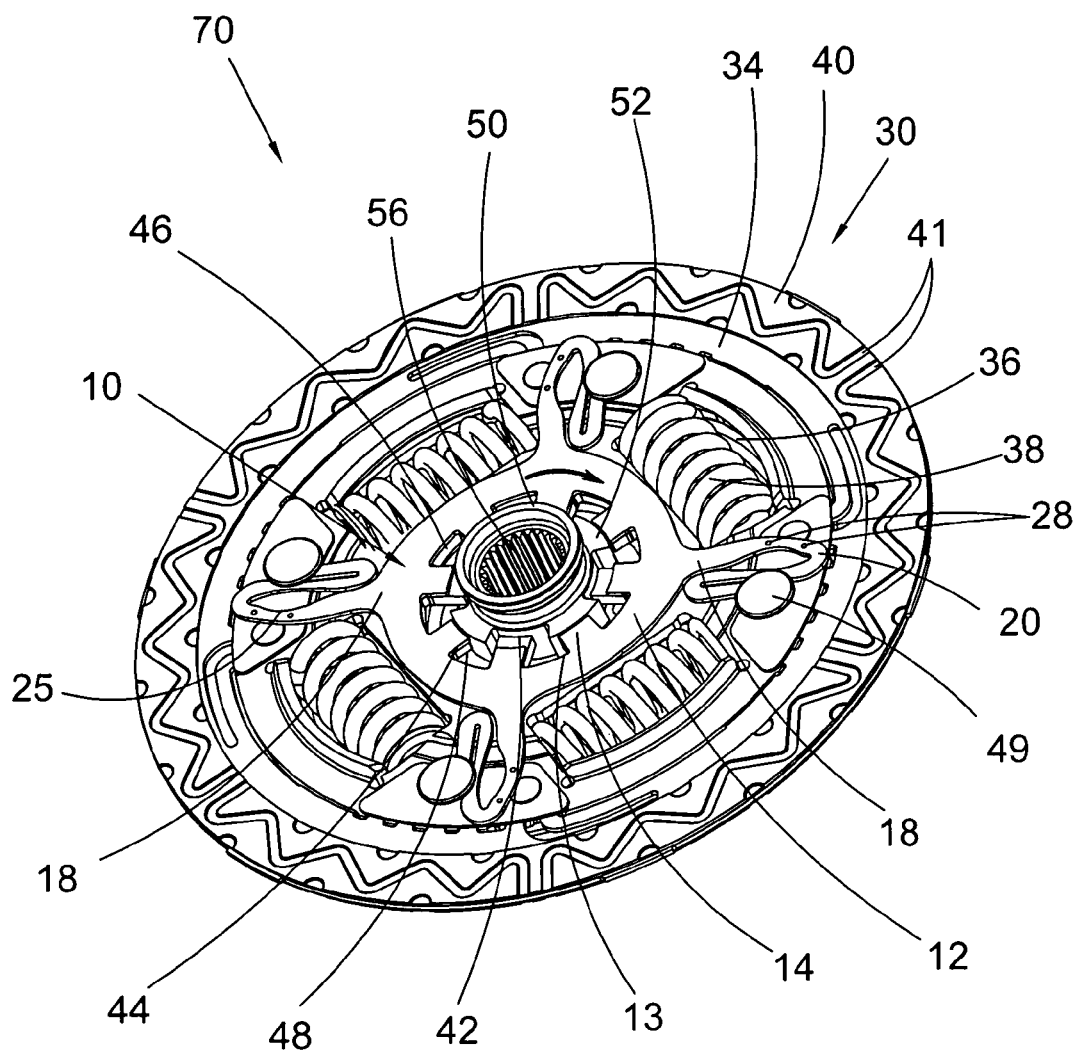
FIG. 7 depicts is a top perspective view depicting the initial step in constructing one embodiment of the lash prevention spring plate assembly of the present invention; and, FIG. 8 is a top perspective view depicting the lash prevention assembly from the side of the lash spring in which the turbine teeth are seen extended through the damper hub.

FIG. 7 depicts the next step in construction of assembly 70 following the attachment of lash spring 10 to damper hub 30. Attached lash spring 10 is rotated clockwise (see arrow) to align spring splines 14 over damper splines 42 and 44. In the preferred embodiment shown, spring spline 14 is narrower or the same width and shorter than the corresponding damper spline beneath it. By alignment is meant that spring splines 14 are positioned over the damper spline directly beneath it so that if spring spline 14 is narrower than the corresponding damper spline 42 or 44, no part of spring spline extends into space 48. While lash spring 10 is held in this aligned orientation, turbine teeth 66 of turbine hub 60 are inserted into space 48 from the opposite side of damper hub 30. Lash spring 10 is then released to rotate counterclockwise back toward its natural offset orientation and spring splines 14 become biased against turbine teeth 66. It will be recognized by persons of skill in the art that the alignment and release rotations of lash spring 10 may be in a counterclockwise direction.

Figure 8:
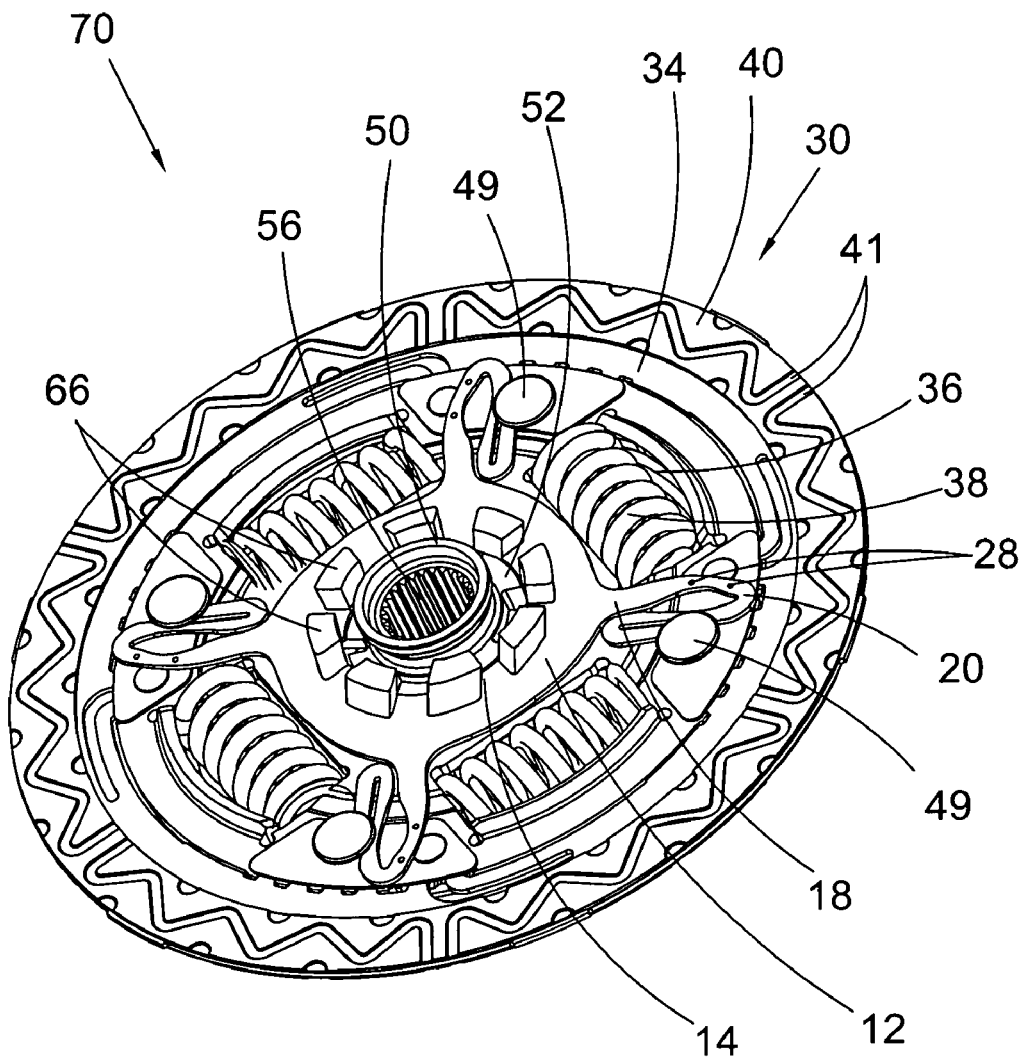

FIG. 8 depicts the lash prevention assembly 70 as seen from the side supporting lash spring 10. Turbine teeth 66 are seen extended through space 48 with spring splines 14 biased against turbine teeth 66. Although not shown, a transmission input shaft may pass through output hub 50 to which it may be connected using a plurality of splines.

This arrangement of assembly 70 acts to prevent torsional (rotational) lash caused by the torsional vibration of turbine teeth 66 against splines 42 and 44. A situation often occurs in which the splines or teeth of turbine hub 60 (and the turbine, if connected with a spline connection) and damper hub 30 contact each other with every firing of the engine. When the turbine in the torque converter rotates, it creates inertia such that it tends to maintain its rotational speed. This inertia is transmitted to turbine hub 60. Every engine firing slightly increases the rotational speed of the turbine-turbine hub connection. This increase is transmitted to damper hub 30 through the spline connection of turbine teeth 66 with damper splines 44. Between firings, the turbine and turbine hub 60 slow but damper hub 30 and damper splines 44 still tend to rotate at the higher speed. This causes turbine teeth 66 to knock against splines 44 causing a rattle. By biasing lash spring 10 against turbine teeth 66, the rotational inertia is absorbed by the lash spring 10 and turbine teeth 66 are held against splines 44 thereby reducing or eliminating the rattle.

Thus it is seen that the objects of the invention are efficiently obtained, although changes and modifications to the invention should be readily apparent to those having ordinary skill in the art, which changes would not depart from the spirit and scope of the invention as claimed.

We claim:

1. An assembly for reducing torsional lash in a torque converter comprising:
   a lash prevention spring, said lash prevention spring comprising:
      a central body;
      a plurality of spring legs extending from said central body, wherein each of said spring legs forms an s-curve, said s-curve including a middle section having a reduced width, a proximal end attached to said central body, and a distal end; and,
      an internal circumference enclosed by said central body, said internal circumference formed into a plurality of spring teeth extending radially from said internal circumference;
   a damper hub comprising;
      a damper plate having a first side, a second side, and an internal circumference having a plurality of damper teeth extending radially from said internal circumference, said plurality of damper teeth comprising short and long teeth, said short and long teeth alternating in position with each other and evenly spaced around said internal circumference; and,
      a plurality of spring leg receiver posts fixedly attached to said first side of said damper plate, wherein each of said spring leg receiver posts contacts said distal end of one of said plurality of spring legs and wherein some or all of said plurality of spring leg receiver posts are positioned to contact one of said distal ends of each of said plurality of spring legs; and,
   a turbine hub, said turbine hub comprising:
      an outer flange;
      an inner circumference; and,
      a plurality of turbine teeth extending substantially perpendicularly from said inner circumference and evenly disposed around said inner circumference;
   wherein each of said plurality of turbine teeth extend from said second side of said damper plate between some or all of said damper teeth and wherein each one of said plurality of spring teeth is biased against one of said plurality of turbine teeth.

2. The assembly for reducing torsional lash as recited in claim 1 wherein each of said damper hub plate and said turbine hub outer flange are annular.

3. The assembly for reducing torsional lash as recited in claim 2 further comprising friction material associated with said damper plate.

4. The assembly for reducing torsional lash as recited in claim 2 wherein at least one of said plurality of spring teeth is misaligned with at least one of said plurality of damper teeth.

5. The assembly for reducing torsional lash as recited in claim 2 further comprising a torque converter output hub, said output hub having at least two splines and positioned within said inner circumference of each of said damper hub and said turbine hub, one of said long damper teeth extending between each of said at least two splines.

6. The assembly for reducing torsional lash as recited in claim 1 wherein a tension contact is formed at or near said distal end of said plurality of spring legs.

7. The assembly for reducing torsional lash as recited in claim 6 wherein said tension contact comprises a v-shaped groove.

8. The assembly for reducing torsional lash as recited in claim 6 wherein said tension contact comprises a curved shape.

9. The assembly for reducing torsional lash as recited in claim 1 wherein said outer flange defines a plurality of holes.

10. The assembly for reducing torsional lash as recited in claim 1 wherein said damper hub further comprises:
    at least one spring window defined by said damper plate and formed to hold a compression spring; and,
    at least one compression spring, each of said at least one compression spring positioned within one of said at least one spring window.

* * * * *